April 14, 1959    F. D'ORNELAS ABREU    2,881,806
LOOM SHUTTLE
Filed Nov. 14, 1956
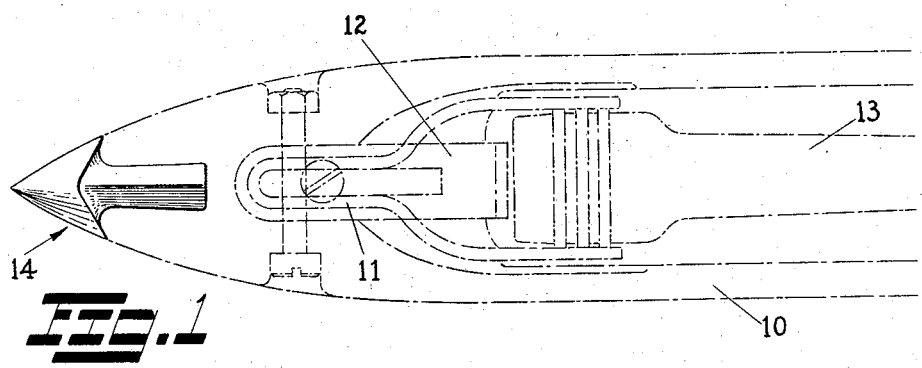
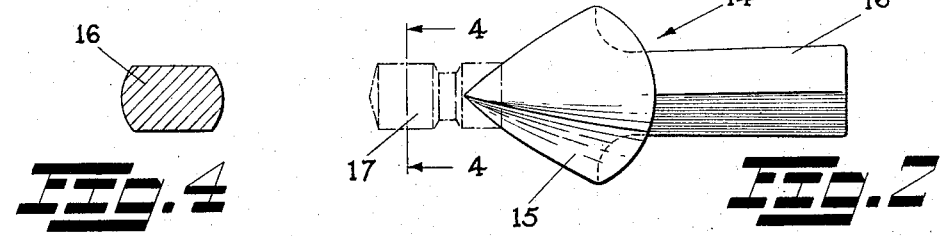
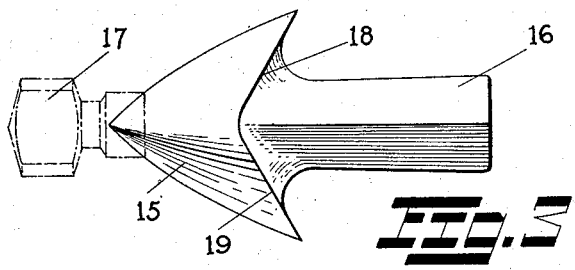
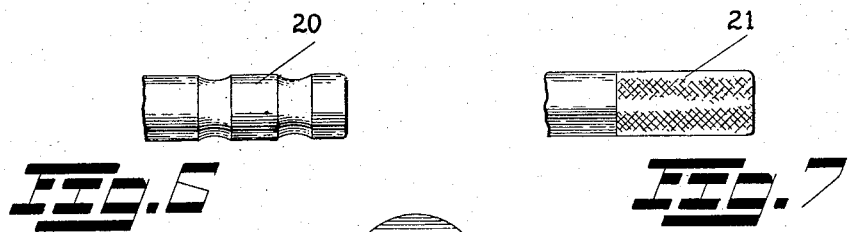
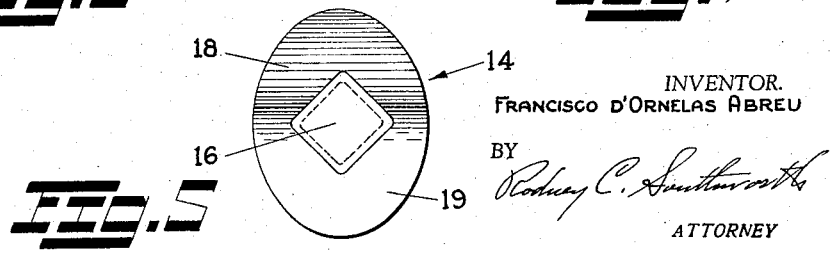
INVENTOR.
Francisco d'Ornelas Abreu
BY
ATTORNEY 2,881,806
LOOM SHUTTLE Francisco d'Ornelas Abreu, New Bedford, Mass.

Application November 14, 1956, Serial No. 622,116

5 Claims. (Cl. 139—196)

This invention relates to shuttles for looms, and more particularly, to a novel spur and combination of a shuttle body therewith.

It is a general object of the invention to devise a shuttle spur and so to mount it in a shuttle body as to prevent warp or other threads from entering between the spur tip and adjacent body of the shuttle.

A further object is to devise such a shuttle spur which shall be applicable to shuttles of wood, of molded plastic or other materials.

Another object is that of devising such a shuttle spur which shall be easily formed by molding, forging or in other manners and which can be produced at a price making it practical for all weaving wherein it may be advisably utilized.

Other objects will become apparent from the following disclosure.

Shuttle spurs as used in practice have had a conical tip and a shank by which they are held in place in the shuttle body. This tip has in all instances of commercial weaving had a section joining the shank which has been cut or formed at right angles to the spur center line and in a single plane which abuts against the flat face of the shuttle body. For most weaving this has served well, but it is a fact that wood shrinks, spurs become loosened, the material at or adjacent the plane of contact between the two parts becomes worn or otherwise displaced with unpleasant results. Such conditions give rise to a narrow space opened to receive a thread or a lip at either the tip or material adjoining it which may catch and rupture the thread, usually the warps. If the material used is nylon or orlon of fine denier this problem may become acute and has required a regular program of repair of shuttles by which every so often, the shuttle spurs have had to be driven in and the shuttle point, both wood and metal sanded down or otherwise polished.

While shuttle spurs have been formed with tongues or the like to overlie the wood and to be driven into it in some instances, these have never been practical and, in fact, would give rise to catching of the warp in many instances. They are not dependable and cannot be made by any practical process nor can they be fitted to the wood or material of the shuttle body without difficulty.

According to the invention, a spur is formed with a tip which has a generally conical point, but behind that point is so formed as to have two ears or wings which are solid (not a shell or cap) and which result from the fact the rear face of the tip is V-shaped in plan since it has two planes intersecting at about the center line of the shank and including an obtuse, dihedral angle. The cooperating end of the shuttle to which the spur is fitted is complementary in that it is bevelled off to present two angular intersecting planes which exactly fit those of the spur. In the case of wooden shuttles the body of the shuttle is cut to fit, while molded plastic shuttles are formed during molding with the spurs in place in the cavity of the mold.

The angular form of the joining faces leaves the spur tip to extend as spaced ears at each side of the shuttle. The line between metal and wood, or metal and plastic is disposed at an acute angle to the length of the shuttle and thus as the shuttle moves through the warp a warp thread cannot enter a space between spur tip and body if there should be one. Even if one of these parts extends beyond the other or a spur loosens slightly, the shuttle may still be used without damage to the warp.

The invention will be described in greater detail by reference to one specific embodiment and certain modifications thereof as illustrated in the accompanying figures of drawing, wherein:

Fig. 1 is a plan view of a shuttle to which the invention has been applied.

Fig. 2 is an elevation of the novel spur.

Fig. 3 is a plan view of that spur.

Fig. 4 is a section taken at line 4—4, Fig. 2.

Fig. 5 is an end view of the spur.

Figs. 6 and 7 are modifications of spur shanks which may be used for spurs driven into wooden shuttles.

Referring to Fig. 1, a shuttle of usual form, either wood, molded plastic or other material, comprises a body 10, and is provided with a spring 11 and cover 12 adapted to retain a bobbin 13. This shuttle has at each end a spur one of which is designated at 14 and of novel construction. This spur shown in detail in Figs. 2, 3, 4 and 5, has a tip 15 and a shank 16. The spur illustrated in these figures is designed to be used in molded plastic shuttles and therefore has a position retaining lug 17 extending from the tip. This is shown in dot-and-dash lines and of course at a later stage in the production of a shuttle, is removed by any appropriate method to leave a sharp, conical tip.

This positioning lug is held in the mold one spur being fixed at each end whereupon the molding compound is injected to fill the cavity and, in so doing, will flow about the shank and fill the mold up to the tip. Since, as will be explained, the spur is to bear a particular relationship to the rest of the shuttle, the lugs 17 are slabbed off at least one side for purposes of certainty in positioning.

The tip 15 is so formed that its faces 18 and 19 against which the end of the shuttle body abuts are substantially planar and form a dihedral angle as shown. This angle, Fig. 1, is so disposed that the vertex line is vertical, assuming the shuttle to be positioned as used in a loom with more or less horizontally disposed warp threads. As a result the spur tip presents wings at each side of the shuttle of a general elliptical profile at the line of juncture between metal spur and plastic or wooden body, as the case may be.

A shank 16 for molded shuttles is preferably of noncircular section and either tapered as shown to resist loosening or withdrawal, or may be formed with a mushroomed end. Instead of the square section shown, the shank may be circular, but knurled or in some manner roughened to resist turning.

The dihedral angle along with the fact the spurs are placed in the shuttle with the wings at the sides, makes the lines at which spur and body join angularly disposed to the length of the shuttle. Thus a warp thread cannot enter between the two parts even if at some time during use, the spur and body should become slightly separated at these planes.

Several methods of production may be used, for example, spurs may be molded by some one of the newer methods of casting in which steel of the desired hardness may be cast with sufficient precision so that the only work needed will be a grinding and polishing of the exterior conical surface of the tip along with removal of the lug.

Again these spurs may be forged either hot or cold, or may be machined from bar stock, or a combination of these methods may be used.

If the spur is to be used in wooden shuttles, the end of the wooden body is to be bevelled off at each side to proper dimensions for length and angle and drilled so that as the spur is driven in under pressure, it will seat tightly against the wood. There need be no lug 17 in such case, and when driven into place, the shanks may be pinned, or other common expedients employed to assist in holding. Of course both body and spur must be properly related before pressure is applied so that the parts will fit as intended.

For use in wood, the shank is formed as at 20, Fig. 6, or at 21, Fig. 7, so that it may be forced into the wood, a drilled hole in which is, of course, considerably smaller than the shank diameter.

The shank is preferably formed as an integral part of the spur, but in some instances, it may be practical to make these parts separately and to weld the shank to the tip. Again, the shank may be threaded and the tip drilled and tapped and the two thus assembled.

Normally, a generous fillet is provided between shank and the planar surfaces of the tip, but that is not necessary, and in fact, the extent of these faces 18 and 19 should be extensive and substantially flat.

While one embodiment and certain modifications thereof have been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In a loom shuttle the combination of a shuttle body and a spur having a shank and a tip, the spur shank being inset in the shuttle body, said spur tip being of conical form and at its surfaces abutting the body being characterized by two planes intersecting centrally of the spur, in a line directly substantially vertically of the shuttle and forming an obtuse dihedral angle between them, said body having its surfaces adjacent the spur tip of similar but complementary form.

2. In a loom shuttle the combination of a molded plastic shuttle body and a spur having a shank and a tip, the spur shank being inset in the shuttle body during molding and being formed with a larger section at its free end to resist displacement, said spur tip being of conical form and at its surfaces abutting the body being characterized by two generally planar surfaces intersecting centrally of the spur and forming an obtuse dihedral angle between them, the adjacent surfaces of the molded body conforming to those of the spur tip.

3. Mechanism as defined in claim 2 wherein said spur shank is of non-circular cross section.

4. A shuttle spur having a tip and shank, said tip being of conical form and having generally planar surfaces adjacent the shank for abutting against a shuttle body end in which it is adapted to be inset which surfaces form an obtuse dihedral angle, said shank being of non-circular cross section merging into the planar surfaces through a filleted section and enlarged at its free end to prevent its withdrawal from a shuttle body in which it may be inset.

5. A shuttle spur as defined in claim 4 wherein the spur shank is tapered to diverge toward its free end.

References Cited in the file of this patent

UNITED STATES PATENTS

| | | |
|---|---|---|
| 1,527,043 | Gladue | Feb. 17, 1925 |
| 2,658,533 | Gosselin | Nov. 10, 1953 |
| 2,699,186 | Gosselin | Jan. 11, 1955 |

FOREIGN PATENTS

| | | |
|---|---|---|
| 409,404 | Italy | Feb. 14, 1945 |
| 1,021,811 | France | Dec. 10, 1952 |

OTHER REFERENCES

Webster's New International Dictionary. Springfield, Mass.: G. & C. Merriam Co., 1939. (2nd edition.)